455/12

April 18, 1967 G. A. FERGUSON, JR., ETAL 3,315,164

CONTROL OF GROUND STATION TRANSMITTER POWER TO SUPPLY SUITABLE SIGNAL LEVEL TO SATELLITE REPEATER

Filed May 15, 1964 2 Sheets-Sheet 1

INVENTORS G. A. FERGUSON, JR.
H. I. G. MAUNSELL

BY G. E. Hirsch Jr.

ATTORNEY

CONTROL OF GROUND STATION TRANSMITTER POWER TO SUPPLY SUITABLE SIGNAL LEVEL TO SATELLITE REPEATER

Filed May 15, 1964

2 Sheets-Sheet 2

United States Patent Office 3,315,164
Patented Apr. 18, 1967

3,315,164

CONTROL OF GROUND STATION TRANSMITTER POWER TO SUPPLY SUITABLE SIGNAL LEVEL TO SATELLITE REPEATER

Gerald A. Ferguson, Jr., and Henry I. G. Maunsell, Murray Hill, N.J., assignors to Bell Telephone Laboratories, Incorporated, New York, N.Y., a corporation of New York Filed May 15, 1964, Ser. No. 367,791
12 Claims. (Cl. 325—4)

Figure 1:
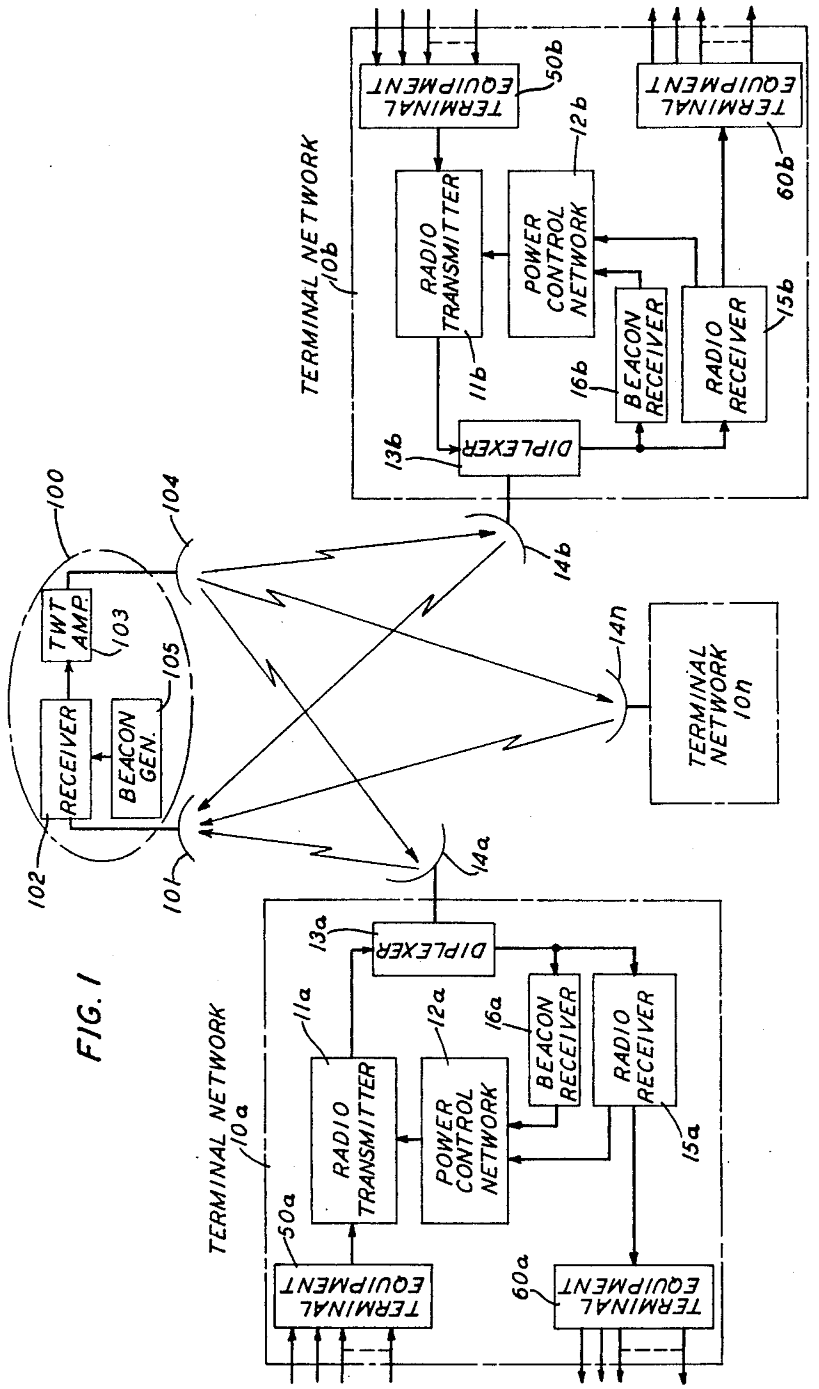

This invention relates to broadband radio relay systems and more particularly to improvements in satellite communication systems utilizing traveling wave tubes as the satellite repeater amplifier.

A satellite repeater in a radio relay system must be versatile with respect to the type of signal that it can handle. It may sometimes be required to carry just one very broad band signal; at other times it may be required to carry many separate signals. Because of its excellent broadband performance, a traveling wave tube (TWT) amplifier may form the heart of the repeater. For simplicity, the repeater may not even employ limiters or automatic gain control (AGC). With such simple circuits, the input signals to the repeater must be maintained within a suitable narrow range of levels or loss of efficiency or the generation of distortion will occur. For a multiple-access satellite system, the matter of signal level is of importance even if limiting or AGC it utilized. When several ground stations are transmitting signals via one satellite repeater, particularly one with such simple construction, it is imperative that the absolute level of each signal be maintained individually in order that all levels will be correct relative to one another, and that the total power input to the TWT will be held within proper limits.

If, on the one hand, the transmitted carrier level at any one ground station is allowed to drop too low, the down-path carrier-to-noise ratio ($C/N$), and the satellite transmitter efficiency suffer needlessly. If, on the other hand, the carrier is allowed to exceed its optimum level, the total power in the satellite TWT rises until cross modulation becomes troublesome and weaker carriers may even suffer gain reduction due to the "capture" effect caused by limiting action near tube saturation. Therefore, the problem at each ground transmitter is to adjust the transmitted carrier level properly with relation to the momentary power level at the TWT input. The correct level is a function of the number of active ground stations, the number of message circuits transmitted from each ground station, and the type of service handled as well as the slant range and other system variables. In a typical system, it might be expected that individual ground stations will start and stop supplying signals to the repeater at different times, and that transmitting conditions between one or more of the ground stations and the satellite will be different from time to time.

It is, therefore, an object of the invention to control the power level of each one of a number of independent ground stations supplying signals to a satellite repeater, in order to provide the optimum signal input to the traveling wave tube amplifier in the satellite.

It is another object of the invention to simplify the requirements of a multiple-access satellite repeater amplifier through self-control of the power level of each ground station transmitter.

It is another object to assure that each ground station provides a signal of proper level to a TWT repeater.

Briefly stated, the invention employs a closed loop in which each ground station monitors the level of its own signal retransmitted by the satellite, and compares it with the magnitude of a fixed level reference signal radiated by the satellite. The reference signal is generated in the satellite and introduced at the input to the TWT repeater. Inasmuch as both signals pass through the same amplifier circuit and since both suffer almost identical path losses, the comparison provides an indication of the relative magnitude of the power levels at the input to the satellite TWT. As a result of the comparison, the output power level of the ground station is adjusted so that the received signal is at the correct level relative to that of the reference signal. Since a closed loop exists between each ground station and the satellite, and since each ground station continuously monitors the difference between the level of its own signals received from the satellite and the reference signal level, the power of each signal supplied to the TWT repeater in the satellite remains essentially a constant. Most important, the total power at the TWT input remains carefully controlled, notwithstanding a change in the total number of stations utilizing the satellite at any one time. Variables within the transmit-receive link that are not amenable to prediction and preset control are accommodated with the closed loop. These variables include librations, IF amplifier variations, antenna pattern ripples, and weather effects, whether or not the last are discernible from the ground station.

Figure 2:
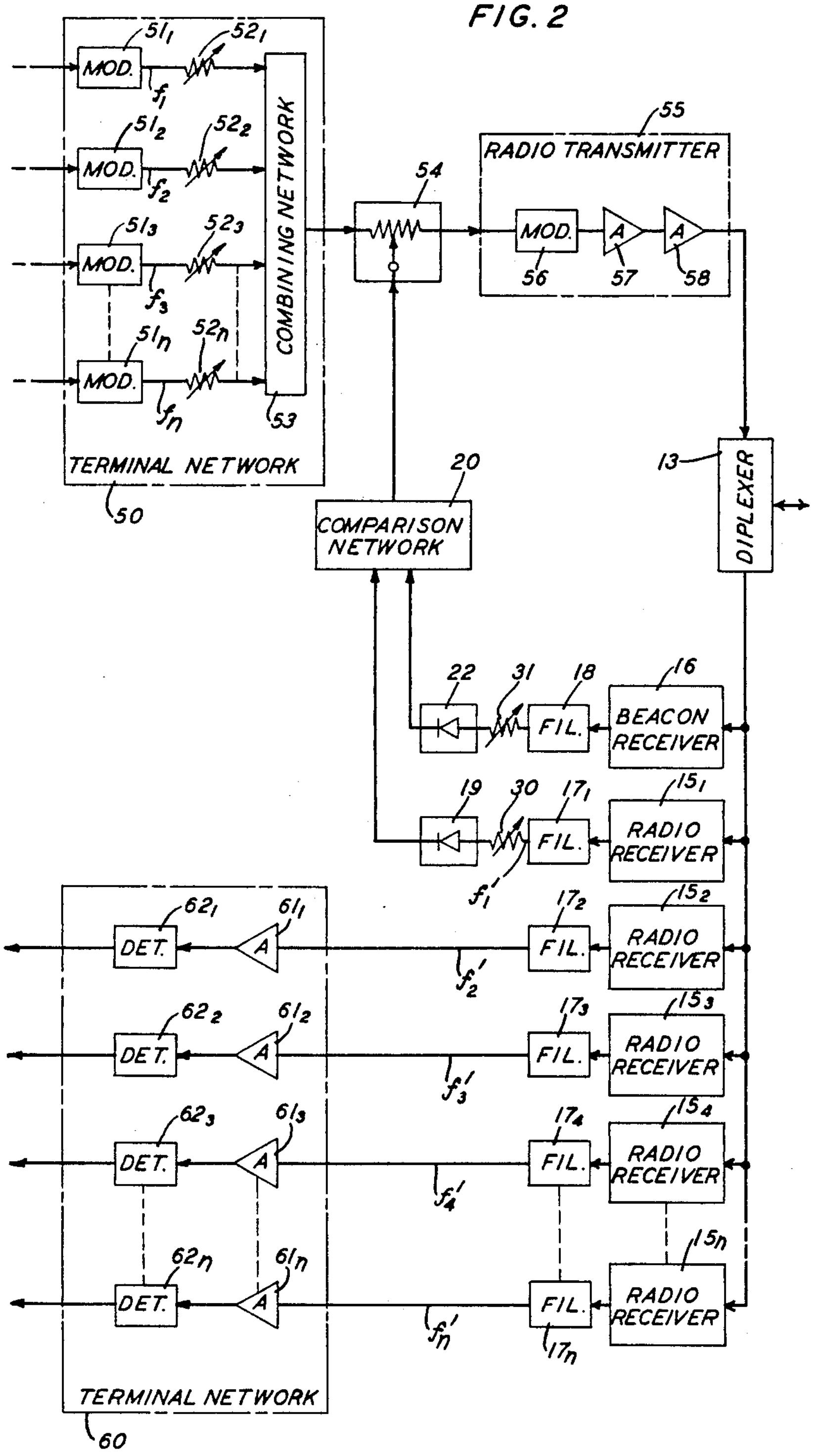

The invention will be fully apprehended from the following detailed description of an illustrative embodiment thereof taken in connection with the appended drawings in which:

FIG. 1 illustrates in block schematic form a closed loop monitoring system for a multiple-access satellite repeater system, in accordance with the invention; and FIG. 2 illustrates in block schematic form a typical ground station for use in the closed loop system of the invention.

FIG. 1 illustrates by way of a simplified system diagram, the essential features of the invention. A number of ground stations 10*a* . . . 10*n*, at different geographic locations, are arranged to communicate by way of a satellite repeater 100. The several ground stations are typically arranged to accommodate a number of different signals, e.g., by means of a frequency multiplex system in which each independent signal is assigned to one particular frequency sub-band within the frequency spectrum assigned to the ground station. After assignment to the proper frequencies, the signals are supplied to radio transmitter 11 which, under the influence of power control circuit 12, prepares the signals for transmission at the assigned radio frequency. The suitably modulated signals are supplied to diplexer 13 and thence to antenna 14. Ordinarily, the antenna is highly directional and under control of a satellite tracking system (not shown and not part of this invention) which keeps it trained on the satellite repeater. The repeater will normally move somewhat with respect to the ground stations even though it is in a so-called synchronous orbit. In a nonsynchronous orbit, considerable relative motion will of course be encountered. Nonetheless, antenna 14 trains constantly on satellite 100 so that signals emanating from it reach satellite receiving antenna 101.

Signals received by the satellite 100 are detected, amplified, and processed in receiver apparatus 102 and supplied to final amplifier 103, which advantageously employs a traveling wave tube element. Within the receiver apparatus 102, the signal may be translated in frequency one or more times, and the signal transmitted from the repeater, while retaining all the characteristics of the received signal, may not be at the same frequency. In order to stabilize the power level at the input to TWT amplifier 103, it is in accordance with the invention to utilize as a fixed reference level, in the manner to be described hereinafter, the signal generated in reference signal generator 105 carried by the satellite. It may well be that the satellite repeater carries a beacon signal generator as a part of an "autotrack" system or the like. If this is the case, the tracking beacon may be used as the reference level signal merely by assuring that it is of a known, fixed level at the input of the traveling wave tube amplifier 103. In either case, the fixed level signal generator generally consumes considerably less space and weighs appreciably less than the extensive system of separate amplifiers and gain controls which would ordinarily be required to control the levels at the input to the TWT. The amplified signals, i.e., message signals plus reference signal, are thereupon transmitted from antenna 104 to all ground stations, typically on frequencies different than those received at the satellite on antenna 101.

In order to prevent signal degradation in the TWT amplifying element, and subsequent portions of the transmission circuit due to incorrect signal levels at the traveling wave tube input, it is necessary that the signal input power at this point be carefully controlled for each separate input signal. If the satellite is equipped for the reception and retransmission of one channel only, or for the reception and retransmission of a fixed number of channels, each at a fixed discrete frequency, the problem is easily solved utilizing well known control techniques. However, in order to realize the full flexibility and advantages of a broadband multiple-access system, the techniques heretofore employed in such systems, such as independently filtering and limiting the intermediate frequency channels for each signal, are not satisfactory. For a broadband system, each separate signal must be independently adjusted in level at the ground transmitter to maintain a fixed power ratio between the level of the individual signal and the power level of the beacon at the input to the TWT. The magnitude of this fixed ratio is established from calculations based upon the number of message channels carried by the signal under consideration, the total number of signals to be carried by the satellite repeater, and by their respective message loadings. For a typical multiple-access system, ground stations will communicate with one another from time to time separately or together as required by way of the repeater. As a consequence, the total input power level to amplifier 103 will be highly variable. In accordance with the present invention each individual signal is maintained at its calculated power relation to the level of the beacon as stations are added and deleted from the broadband channel as required by message traffic.

Signal level control takes place at each ground station in the following manner. Signals received from the satellite on antenna 14 are delivered by way of diplexer 13 to multiple channel radio receiver 15 tuned to the individual assigned frequencies of the communication system. Ordinarily, these frequencies are those transmitted by the satellite and assigned to other ground stations, i.e., the receiver is tuned to receive signals from other ground stations. However, receiver 15 is also tuned to the frequency of one of the signals carrying information transmitted by the same ground. For example, receiver 15*a* in terminal network 10*a* receives one of the signals transmitted to the satellite from station 10*a*. The reference signal frequency is also received at each ground station, typically by a separate receiver 16, supplied with signals from diplexer 13. The two signals thus received from the satellite are, after suitable processing, compared in power control circuit 12, e.g., in a level comparison circuit such as a differential amplifier, and a difference, if any, is utilized as an error signal to control the power output of radio transmitter 11. A variable attenuator network or the like connected at the input of transmitter 11 is suitable although other power control means may, of course, be employed. Ordinarily the difference between the level of the reference signal and the return signal for the particular ground station is a known constant which may be accommodated in the adjustment of the comparison circuit in power control network 12. Any variation from this known difference gives rise to the error control signal.

It will be evident that by use of the closed loop system of power control, described hereinabove for one ground station, at each of the ground stations communicating by way of satellite 100, a constant power level is maintained at the input of the TWT amplifier in the satellite, independently of the number of ground stations in operation. If the path loss between a transmitter and the repeater changes for any reason, such as a change in range, satellite libration, or weather effects, each transmitting station immediately compensates and readjusts its transmitting power. This assures low distortion and an optimum carrier-to-noise ratio at all times.

The manner in which the power level control of the present invention is carried out may be illustrated by assuming a number of relative power levels for the several ground stations and the satellite repeater amplifier, and noting the way in which a change in the output power level of any one ground station alters the total power transmitted by the satellite and the way in which all other ground stations immediately compensate for this change. Assume, for example, that each ground transmitter station momentarily radiates sufficient power to develop a level of 25 milliwatts at the input to repeater TWT 103. Beacon generator 105 may be assumed to produce a power level at the TWT input of 1 milliwatt. All signals are increased in amplifier 103 one hundred fold, so that message signals are retransmitted to all ground stations at a level of 2.5 watts and the beacon signal at a level of 100 milliwatts.

Because of atmospheric conditions and other attenuating factors, the signals received at a typical ground station are in the neighborhood of 25 microwatts for the message signals, and 1 microwatt for the beacon signal. Since the correct ratio for the message signals and beacon signal at the input to the repeater TWT is selected, in this example to be 25 to 1, the message signal power at the ground station may be brought into correspondence with the beacon signal by attenuating it by a factor of 25. Hence, two 1 microwatt signals at the power control circuit indicate a correct power level for the ground station transmitter. A deviation from this equality will result in immediate correction. Of course, the differential circuit or other comparison means used may operate on the two signals as received, i.e., the appropriate ratio may be taken into account in the design of the circuit.

Assume that in addition to the several ground stations already working, another ground station commences operation, thereby increasing the total power at the input to the TWT. Further assume that the latter ground station, the one commencing operation, is assigned a nominal transmission level such that it too should produce a power input to the repeater TWT of 25 milliwatts. The comparison circuit in power control network 12 for the latter ground station then adjusts, in a manner similar to that of the station already in operation, the output power of that station. If the two transmitting stations are to be the only ones in operation during the transmission period being considered, optimum efficiency in the use of the repeater TWT amplifier will result if the two 25 milliwatt signals and the 1 milliwatt beacon signal at the TWT input drive it slightly into amplitude compression. When in compression, the TWT acts as many well known aplitude limiter elements having gain; that is, when a strong signal drives the element into limiting while experiencing a power gain of $G_0$, any accompanying weaker signal experiences a power gain of G, which is less than $G_0$. The larger signal thus suppresses weaker signals to some degree. This phenomenon is well known in the art as the FM "capture" effect.

If a station just commencing operation initially so adjusts its ground transmitter power by means of tracking data, for example, to produce exactly the required 25 milliwatts at the repeater TWT input, the previously operating station will suffer no signal impairment. Neither will the station commencing operation suffer a down-path $C/N$ ratio penalty because of insufficient power at the TWT input. If, on the other hand, the newer station commences operation in such a manner that, through misadjustment or transmission deviations, it produces, for example, 40 milliwatts instead of the required 25 milliwatts at the amplifier input, signals from the previously operating station undergo gain reduction in the TWT because of "capture" by the stronger signal. The beacon also undergoes the gain reduction and the relative strengths of the beacon and the already operating station remain essentially unaffected even though their gains and absolute power thus are reduced. The comparison circuit in the first ground station produces no error output and consequently makes no transmitter power adjustment.

However, in the second ground station, which has just begun operation, the comparison circuit recognizes that its own received signal strength is greater than the required 25 microwatts and that the beacon strength is less than the expected 1 microwatt. As a result, the comparison network at that station produces an appropriate error signal which indicates the magnitude and algebraic sign of the deviation from the desired power relation. The power control network thereupon takes corrective action by reducing the transmitter power output until the received strengths of the station's own signal and that of the beacon are in the correct 25 to 1 relation.

Had the second ground station commenced operation with the transmitted signal weaker than required to give the proper 25 milliwatt input to the TWT, no degradation or change would have been noted in either the beacon or the signal from the previously operating station. However, the down-path carrier-to-noise ratio of the newer station would have been less than it would have been if the transmitter power had been properly adjusted. The comparison circuit in the newer ground station would have recognized the fact that its own station's received signal produced only 15 microwatts of received power as compared with the 1 microwatt of unchanged beacon power. The error signal output of the comparison circuit would then have caused the power control element to increase the ground transmitter output power until the correct 25 to 1 power relation between the signal and beacon was established.

The power control process of the invention may be generalized to greater numbers of transmitting stations using a common repeater. By means of known transmission schedules, each station is assigned a precise relation between its signal level and that of the beacon at the TWT input. The relative levels are established by calculations based upon the degree of message loading of the carriers of each of the transmitters using the common repeater. The total power capability of the repeater amplifier may, if desired, be subdivided and allocated in this manner. By means of the comparison and power control systems, previously described, each individual ground station transmitter maintains its individual power level with respect to the reference signal level at the assigned constant value, regardless of transmission deviations in the up-path or changes in the mode of operation of the other ground stations.

As the various stations start and stop operation, the total power input and output would vary substantially unless by prior agreement all other stations simultaneously readjusted their absolute power levels to utilize fully the capability of the TWT amplifier. Regardless of whether this readjustment of absolute power is employed, the individual stations, equipped with the control system of the present invention, still maintain a fixed calculated relation to the beacon power in proportion to their individual message loading. The precise relation varies with the number of stations using the repeater if it is desired to maintain full tube power at all times. The relation between levels for any fixed number may similarly be calculated when the individual message loadings are known. In normal service, the simpler technique of allowing the total power to vary is satisfactory.

FIG. 2 illustrates in somewhat greater detail the apparatus employed at one ground station for carrying out the operations discussed briefly above. Typically, a plurality of baseband circuits terminate in network 50. Network 50 may include a plurality of modulators 51, including automatic frequency control amplifiers and the like of any type well known in the art, for placing the individual input signals individually on suitable carriers $f_1 \ldots f_n$ for frequency multiplex transmission. A plurality of attenuators 52 may be provided for manually adjusting the levels of each of the individual signals. The resultant signals are then combined in network 53 and supplied to variable attenuation device 54, e.g., a variolosser, wherein the level of all of the signals together is adjusted automatically as required. The adjusted signals are then supplied to transmitter 55 of any conventional construction and which may typically include modulator 56, driver amplifier 57, and power amplifier 58. The RF signals developed by transmitter 55, representing individual message signals in frequency $f_1, f_2, \ldots f_n$, are then supplied by way of diplexer 13 to an antenna for transmission to a satellite repeater.

Incoming signals are supplied by way of diplexer 13 to radio receivers $15_1$–$15_n$, and to beacon receiver 16. After the individual signals on frequencies $f_1' \ldots f_n'$ have been separated by means of IF filters $17_1$–$17_n$ or the like, the message signals are supplied to terminal network 60 and, by way of amplifiers 61 and detectors 62, to a plurality of individual external circuits. The beacon signal may, if desired, also be passed through a bandpass filter 18.

The relative levels of the received signal associated with the local ground station, namely, $f_1'$, and the received beacon signal at frequency $f_b$ are then compared. Conveniently, the two signals are passed through preset attenuators 30 and 31, respectively, to establish the appropriate ratio of levels, discussed above, and are reduced to baseband via rectifiers 19 and 22, respectively. They are supplied, after detection to comparison network 20 which, for any indicated difference, develops an error signal. Variable attenuator 54, in the transmitter signal circuit, is thereupon adjusted in accordance with the sign and magnitude of the error signal.

Because of long transmission times, the response time for this system will be quite large. However, except in the case of a spinning satellite, it will still follow all of the expected variations in overall path loss. If used with the satellite that has fast AGC, special attention must be given to the stability problem and the circuits must be adjusted to avoid repeated overshooting or hunting when corrections are made.

The closed loop system will greatly reduce fluctuations in the levels of the signals reaching the satellite. Some error will still exist, however, because of inaccuracies in the servo system including the effects of finite loop gain and amplifier drift. Further, there is usually some drift in the ground receiving equipment and some changes may take place in the absolute level of the beacon signal in the satellite circuit. An overall accuracy of $\pm 0.75$ db is, however, not uncommon for the closed loop system. In contrast with this, larger errors are encountered in open loop systems. Even discounting errors that can be avoided by station calibration and by a knowledge of individual satellite performance as well as all errors that can be avoided by adjusting for the known range and attitude of the satellite, many other factors remain to cause trouble. Stability of the ground transmitter, polarization errors, and losses due to rain and bad weather all have their effect. An overall deviation of greater than ±2 db is commonly experienced.

The closed loop system of the present invention in no way limits the versatility of the satellite. While not over complicated, it does involve some extra receiving equipment at a minimally equipped station. Thus, it requires that every station shall be able to monitor the level of at least one of its own signals after retransmission from the satellite. This does not represent an excessive expense for even the smallest station, however, when considered in regard to the total cost of the system. Further, it seems likely that it will eventually become necessary for stations to monitor their own signals for switching and alarm purposes. Moreover, the servo system of the present invention takes the place of any other type of servo needed to correct or control the power output of the ground transmitter. Unlike most earthbound systems, a satellite system will not be equipped with parallel channels for orderwire and protection; therefore, the monitoring system of the present invention is advantageous for handling a station's own transmissions without the need for additional radio paths or land circuits.

The above-described arrangements are, of course, merely illustrative of the application of the principles of the invention. Numerous other arrangements may be devised by those skilled in the art without departing from the spirit and scope of the invention.

What is claimed is:

1. A communication system which includes a plurality of ground transmitter-receiver stations for communcating with one another by way of satellite repeater stations, means for individually controlling the transmitted power level of each of said ground stations in order that the power input from said transmitter to said repeater is substantially a constant which comprises: means at said satellite repeater for developing a fixed level reference signal for amplification and transmission along with message signals retransmitted by said repeater, means at each of said ground stations for comparing the level of received fixed level reference signals and one of its own message signals received after retransmission by said satellite repeater to develop an error signal, and means for utilizing said error signal to control the transmitted power level of said ground sation.

2. A communication system as defined in claim 1 wherein said means for controlling the transmitted power level of said ground station transmitter comprises, variable attenuator means controlled by said error signal for adjusting the level of externally applied message signals supplied to the communication transmitter of said ground station.

3. In combination: a terminal station for the transmission of applied message signals; a repeater station including means for receiving signals from said terminal station, means for developing a fixed level signal, means for amplifying said received signals and said fixed level signal, and means for transmitting said amplified signals to said terminal station; and, at said terminal station, means for receiving signals transmitted from said repeater station, and means for adjusting the transmitter power level of said station in accordance with the level of said received fixed level signal and the level of at least a portion of said applied message signal returned from said repeater after transmission therethrough.

4. In a broadband communication system: a plurality of terminal stations for transmitting and receiving signals; a repeater station intermediate said terminal stations for receiving message signals from each of said terminal stations, for amplifying said signals, and for retransmitting said signals to said terminal stations; means at said repeater station for generating a fixed level signal, means for amplifying said fixed level signal and message signals received from said terminal stations, and means for transmitting said amplified signals to all of said terminal stations; and, at each of said terminal stations, means responsive to the relative levels of said fixed level signal and at elast one of said signals originating at that terminal station which are retransmitted by said repeater station and are received from said repeater for adjusting the level of signals transmitted from that terminal station.

5. In a broadband communication system, a plurality of terminal stations, a repeater station intermediate said terminal stations, means at said repeater station for generating a signal of fixed magnitude, means at each of said terminal stations for transmitting message signals to said repeater, means at said repeater station for receiving signals from said terminal station, means at said repeater station for transmitting both said message signals and said fixed magnitude signal, and means at each of said terminal stations responsive to the magnitude of said fixed magnitude signal received from said repeater and the magnitude of at least one of said message signals initially transmitted by that terminal station and retransmitted by said repeater for adjusting the magnitude of signals transmitted from said terminal station to said repeater.

6. In a broadband communication system: a plurality of terminal stations; a broadband repeater station intermediate said terminal stations; means at each of said terminal stations for transmitting a plurality of independent message signals to said repeater on a number of channels within a prescribed broadband of frequencies; means at said repeater station for receiving signals from all of said terminal stations, means for generating a signal of prescribed frequency and level, means for amplifying both said received message signals and said generated signals, and means for transmitting said amplified signals to said terminal stations; means at each one of said terminal stations for receiving said signal generated in said repeater and at least that one of said amplified message signals transmitted by said repeater station which originated at said one terminal station, and means for adjusting the magnitude of signals transmitted from said one terminal station to said repeater in accordance with the relative levels of said two received signals.

7. In a broadband communication system, a plurality of terminal stations, means at each of said terminal stations for transmitting signals at a desired level, a repeater station intermediate said terminal stations for receiving signals of variable power levels from said terminal stations and for retransmitting said signals at a prescribed level, means at said repeater station for generating reference level signals, means for combining said reference level signals with signals received at said repeater station, traveling wave amplifier means for amplifying said combined signals received from said terminal station prior to transmission in order to establish said desired power level, and at each of said terminal stations, means responsive to the level of said received reference level signals and the level of signals returned to the terminal station of origin after transmission through said repeater station for developing a signal proportional to the levels of said received signals, and means responsive to said developed signals for determining the level of transmission of that terminal station.

8. A communication system which includes, a plurality of ground stations, an earth satellite repeater station linking said ground stations, and means at each of said ground stations for simultaneously transmitting a plurality of individual message signals to other ground stations by way of said repeater station, means for controlling the power level of signals passed through said repeater station, which comprises: at a repeater station, means for generating a reference level beacon signal, means responsive to communication signals received from said ground stations and to said beacon signal for amplifying said signals, and means for transmitting said amplified signals to all of said ground stations; and at each of a plurality of ground stations, means for monitoring said beacon signal and communication signals transmitted from said satellite, including a portion of the communication signal which originated at the respective ground station, means responsive to level differences between said monitored original signal received from said satellite and said beacon signal for developing an error signal, and means for utilizing said error signal to control the transmission level of said ground station.

9. In a multiple-access satellite communication system: a plurality of ground stations and a satellite repeater station; means at each of said ground stations for transmitting a communication signal to said satellite; said satellite repeater including means for developing a reference level beacon signal, means responsive to communication signals received from said ground stations and to said beacon signal for amplifying said signals, and means for transmitting said amplified signals to all of said ground stations; means at each of said ground stations for monitoring said amplified beacon signal and the amplified communication signal which originated at the respective ground stations; means responsive to level differences between said monitored original signal received after retransmission by said satellite and said beacon signal for developing an error signal; and means for utilizing said error signal to control the transmission level of said ground station.

10. In a multiple-access satellite communication system: a plurality of ground stations and a satellite repeater station; means at each of said ground stations for simultaneously transmitting a plurality of message signals to said repeater station; said repeater station including means for developing a fixed level signal, means responsive to message signals received from said ground stations and to said fixed level signal for amplifying all of said signals, and means for transmitting said amplified signals to said ground stations; each of said ground stations including means for receiving signals transmitted from said repeater station, and means for adjusting the transmitter power level of said station in accordance with the relative levels of said received fixed level signal and at least one of said message signals initially transmitted from said ground station to said satellite and received at said ground station after retransmission by said satellite.

11. In a multiple-access satellite communication system: a plurality of ground stations for simultaneously transmitting a plurality of applied message signals; a satellite repeater station including, means for developing a fixed level beacon signal, traveling wave circuit means responsive to message signals received from said ground stations and to said beacon signal for amplifying all of said signals, and means for transmitting said amplified signals to said ground station; and, at each of said ground stations, means for receiving message signals and said beacon signal transmitted by said repeater station, said received message signals including at least one signal initially transmitted from that ground station, means for comparing the power level of said received beacon signal and the level of said message signal received from said satellite, and means responsive to said comparison for controlling the level of transmission from that ground station.

12. A multiple-access satellite communication system which includes a plurality of independent ground stations communicating with one another by way of a satellite repeater, said satellite repeater including a traveling wave amplifier and a beacon signal generator supplying signals to said traveling wave amplifier along with message signals received from said several ground stations, and means at each of said ground stations for controlling the power level of transmission of that station, said last-named means comprising: means for receiving said beacon signal transmitted by said satellite repeater, means for receiving message signals transmitted by said satellite repeater from other ground stations, means for receiving at least one signal transmitted by said satellite repeater which originated at that ground station, means for converting said received beacon signal and said message signal which originated at said ground station to a baseband control signal, comparison means supplied with said control signals for developing an error signal proportional to the difference in amplitudes of said signals, controllable attenuation means for passing message signals to the transmitter of said ground station, and means for utilizing said error signal to control said attenuation means.

References Cited by the Examiner

UNITED STATES PATENTS

| | | | |
|---|---|---|---|
| 3,028,489 | 4/1962 | Chasek | 325—3 |
| 3,151,295 | 9/1964 | Haviland | 325—4 X |

DAVID G. REDINBAUGH, *Primary Examiner.*

JOHN W. CALDWELL, *Examiner.*